United States Patent Office 3,388,202
Patented June 11, 1968

3,388,202
METHOD FOR MELTING ACRYLONITRILE
POLYMERS AND COPOLYMERS
Robert E. Opferkuch, Jr., and John C. Ross, Decatur, Ala., assignors to Monsanto Company, St. Louis, Mo., a corporation of Delaware
No Drawing. Filed Sept. 27, 1965, Ser. No. 490,722
12 Claims. (Cl. 264—211)

ABSTRACT OF THE DISCLOSURE

Shaped articles including film, filaments, tile articles and the like are formed by melting acrylonitrile polymers and copolymers in the presence of certain non-solvating organic liquids selected from the group of acetamide, ethylcyanoacetate and formamide which have high dielectric constants and which lower the melting point of the acrylonitrile sufficiently to allow the acrylonitrile to be melted without polymer decomposition occurring.

The present invention relates to molded and extruded products. More particularly, the present invention relates to shaped articles produced from polyacrylonitrile polymers and copolymers thereof which are melted in various liquids having high dielectric constants to facilitate the preparation of said products.

Generally the acrylic polymers will not melt when heated under standard conditions. When heated at atmospheric pressure, the dry polymer will decompose rather than enter a molten state as would occur with thermoplastic materials like the polyamides. It was disclosed in my copending application Ser. No. 450,157 filed Apr. 22, 1965, that acrylonitrile polymers can be converted into a melt phase by heating the polymer in the presence of moisture to elevated temperatures above the boiling point of water and compressing at pressures above atmospheric. This method has been found to be very satisfactory for accomplishing the objects described therein, but for some applications superatmospheric pressures are a disadvantage. For example, when high pressures are employed it is difficult to perform some extrusion operations such as spinning textile filaments.

The discovery has now been made which facilitates the melting of acrylonitrile polymers and copolymers at atmospheric pressure when combined with a large proportion of an organic liquid having a high dielectric constant. Melting temperature of the slurry depends upon the value of the dielectric constant. However, if only a small quantity of the organic liquid is added to the polymers super-atmospheric pressure is required to facilitate melting. Although super-atmospheric pressures may be required when small amounts are employed, the residual organic liquid imparts some degree of plasticity to the polymeric mass to produce an improved molded article.

It is therefore, a primary object of the present invention to provide a method for melting acrylonitrile polymers at atmospheric pressure. Another object is to provide a method for melt spinning acrylonitrile polymers and copolymers to form textile filaments. Another object is to provide melt spun acrylic filaments. Another object is to provide an improved method for producing molded products from acrylonitrile polymers and copolymers.

In accordance with the present invention, acrylonitrile polymers can be melted at atmospheric pressure in the presence of an organic liquid which is not a solvent for the polymers provided the liquid has a high dielectric constant and corresponding boiling point high enough to obviate the necessity of applying pressure to prevent boiling when elevated temperatures are used to melt the polymers. The melting temperature of the polymer has been found to be generally an inverse function of the value of the dielectric constant of the organic liquid employed. Therefore, the lower dielectric constant liquids must possess higher boiling points in order to accomplish a polymer melt at atmospheric pressure. Thus, the organic liquid employed with the present invention must be a non solvent for acrylonitrile polymer and have a dielectric constant high enough to facilitate melting or coalescence of the polymer at temperatures below the decomposition temperature thereof and possess a boiling point higher than the temperature required to melt the polymer.

In a preferred form of the present invention, an organic liquid having a dielectric constant of at least 10, but preferably above 30, is heated initially and then combined in a mixing vessel, while stirring, with an acrylic or modacrylic polymer composition to a ratio by weight of about 1 to 30 percent polymer and 99 to 70 percent of the liquid to form a mixture thereof which is heated until the polymer becomes a plastic, putty-like mass. The molten polymer is transferred from the mother liquid to a heated molding or extruding device for shaping into a molded or extruded product. By "mother liquid" is meant the quantity of the organic liquid which is not absorbed into the polymer and that which provides a bath for the plastic, putty-like mass. The application of working pressure to these devices compresses the absorbed mother liquid from the plastic mass and forms the remaining mass into the shape of the mold, die, or spinning orifice utilized. Upon cooling, the shaped polymer hardens to provide a useful product. The amount of heat necessary for melting the composition is determined by the value of the dielectric constant of the organic liquid and proportion thereof employed. For most compositions however, the polymers melt between 100 to 200° C. Once the polymers reach a flowable state they can readily be extruded into textile filaments using conventional melt spinning techniques or formed into molded products, films, etc. in the usual manner by standard molding operations.

Further in accordance with the present invention, it was discovered that when adding higher dielectric constant liquids to acrylonitrile based polymers in proportions of 20 to 25 percent liquid and 80 to 75 percent polymer, the mixture still appeared to be dry. After mixing in standard dry blending equipment and heating to coalesce the polymer, the melt could be either extruded into filaments having properties suitable for textile manufactures or molded into shaped products. When the liquid content was reduced to below approximately 10 percent, relatively high pressures were generally required to coalesce the polymers. It was found however, that mixtures having 1 to 10 percent liquid and 99 to 90 percent polymer could be compressed into rigid, hard tiles having very good qualities.

The polymer employed in this invention may be polyacrylonitrile, copolymers of acrylonitrile, including binary and ternary polymers containing at least 80 percent by weight of acrylonitrile in the polymer molecule, or a blend comprising polyacrylonitrile or copolymers comprising acrylonitrile with from 2 to 50 percent of another polymeric material, the blend having an overall polymerized acrylonitrile content of at least 80 percent by weight. While the preferred polymers employed in the instant invention are those containing at least 80 percent of acrylonitrile, generally recognized as the fiber-forming acrylonitrile polymers, it will be understood that the invention is likewise applicable to polymers containing less than 80 percent acrylonitrile.

For example, the preferred polymer may be a copolymer of from 80 to 98 percent acrylonitrile and from 2 to 20 percent of another monomer containing the $$>C=C<$$

linkage and copolymerizable with acrylonitrile. Suitable mono-olefinic monomers, including acrylic, alpha-chloroacrylic and methacrylic acids; the acrylates, such as methylmethacrylate, ethylmethacrylate, butylmethacrylate, methoxymethyl methacrylate, beta-chloroethyl methacrylate, and the corresponding esters of acrylic and alpha-chloroacrylic acids; vinyl chloride, vinyl fluoride, vinyl bromide, vinylidene chloride, 1-chloro-1-bromoethylene; methacrylonitrile; acrylamide and methacrylamide; alpha-chloroacrylamide; or monoalkyl substitution products thereof; methylvinyl ketone; vinyl carboxylates, such as vinyl acetate, vinyl chloroacetate, vinyl propionate, and vinyl stearate; N-vinylimides, such as N-vinylphthalimide and N-vinylsuccinimide; methylene malonic esters; itaconic acid and itaconic esters; N-vinylcarbazole; vinyl furane; alkyl vinyl esters; vinyl sulfonic acid; ethylene alpha, beta-dicarboxylic acids or their anhydrides or derivatives, such as diethylcitraconate, diethylmesaconate, styrene, vinyl naphthalene; vinyl-substituted tertiary heterocyclic amines, such as the vinylpyridines and alkyl-substituted vinylpyridines, for example, 2-vinylpyridine, 4-vinylpyridine, 2-methyl-5-vinylpyridine etc.; 1-vinyl-imidazole and alkyl-substituted 1-vinyl-imidazoles, such as 2-, 4-, or 5 methyl-1-vinylimidazole, and other

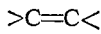

containing polymerizable materials.

The polymer may be a ternary or higher interpolymer, for example products obtained by the interpolymerization of acrylonitrile and two or more of any of the monomers other than acrylonitrile, enumerated above. More specifically, and preferably the ternary polymer comprises acrylonitrile, vinyl acetate, and styrene. For example, the ternary polymer which contains from 80 to 98 percent of acrylonitrile, from 1 to 10 percent of styrene, and from 1 to 18 percent of another monomer such as vinyl acetate.

The polymer may also be a blend of a polyacrylonitrile or of binary interpolymer of from 80 to 99 percent acrylonitrile and from 1 to 20 percent of at least one other >C=C< containing substance with from 2 to 50 percent of the weight of the blend being a copolymer of from 10 to 70 percent of acrylonitrile and from 30 to 90 percent of at least one other >C=C< containing polymerizable monomer.

Other materials such as inert fillers may advantageously be combined with the polymeric materials to produce tiles and the like having decorative colors and patterned designs at reduced costs. Materials which have been especially suitable include those such as sand, marble chips, crushed rocks, pebbles and the like. Coloring schemes may be selectively obtained either by using colored organic pigments or previously colored filler materials. The filler materials and colored pigments may be present in patterned designs or randomly dispersed. The amount of filler materials which can be employed without lowering substantially the performance qualities of the molded products depends largely upon the size of the filler particles. For example, up to about 50 percent sand may exist in a product which exhibits very good quality. However, when adding larger particles a smaller proportion must be used to maintain the good quality.

The tile products were tested for their flexible strength and deflection; the filament properties tested were tenacity and elongation; and the hardness of other molded articles was tested.

Test procedures employed to determine the flexible strength and deflection of tiles made in accordance with the present invention comprises placing a 2 x 3 inch sample on a sample holder consisting of two horizontal sample support rods, ½ inch in diameter, and spaced 2½ inches apart. A third ½ inch diameter rod is placed across the upper surface of the tile midway between and parallel to the two lower support rods. The sample holder is then placed in an Instron device and a downward force exerted upon the third rod until the tile is fractured. The flexible strength is computed as the force required to break the tile divided by the cross sectional area of the tile. The deflection is a measure of the depression of the tile prior to fracture. Tensile strength, tensile modulus, and elongation are measured using standard tensile testing techniques on the Instron.

The following examples wherein all parts are by weight unless otherwise stated will further illustrate the invention.

Example 1

Twenty-five parts of a copolymer consisting of 93 percent acrylonitrile and 7 percent vinyl acetate and 200 parts of ethylene glycol liquid were mixed together to form a slurry and the mixture heated to 180° C. to melt the polymer. The resulting globular melt of polymer was removed to a cylinder and plunger arrangement which was preheated to 180° C. The plunger was depressed at a pressure of 20 p.s.i.g. to extrude the molten polymer through a 1/32 inch hole to form a continuous monofilament. The filament was drawn 1.5 times in a paraffin bath at 110° C. The resulting filament had the following properties: denier 5200; tenacity 1.15 grams per denier; and, 10 percent elongation.

Example 2

Twenty-five parts of a copolymer consisting of 93 percent acrylonitrile and 7 percent vinyl acetate were well mixed with 200 parts of formamide to form a slurry which was heated to 140° C. while mixing continued to melt the polymer. The resulting globular melt of polymer was removed from the mother liquid and transferred to a cylinder and plunger arrangement preheated to 140° C. A continuous monofilament was prepared by the procedure used in Example 1. The resulting filament had the following properties: denier 5900; tenacity 1.3; and elongation 12 percent.

Example 3

A polymer melt as obtained in Example 1 was placed in a preheated (180° C.) cylinder and plunger arrangement, the plunger depressed at 20–50 p.s.i.g. (depending upon extrusion ratio) to extrude the molten polymer through a 10-hole spinnerette having hole diameters of 0.012 inch. The polymer issued from the spinnerette in 10 discrete filaments which when solidified were in the range of 5 to 12 denier with an average tenacity of 0.03 gram per denier.

Example 4

A polymer melt as obtained in Example 2 was formed into a multi-filament tow by the procedure employed in Example 3 except the extrusion apparatus was preheated to 140° C. The filaments had essentially the same properties as those of Example 3.

Example 5

A polymer melt as obtained in Example 1 was placed in a preheated (180° C.) cylinder and plunger arrangement having in the bottom thereof a mold cavity in the form of a pulley wheel. The mold was preheated to a temperature of 180° C. When the plunger was depressed at pressures up to 100 p.s.i.g. the molten polymer was then injected through a hole in the bottom of the cylinder into the mold cavity. The objects obtained by this procedure were rigid and durable displaying Rockwell hardness values of H104, M114 and L122.

Example 6

A polymer melt as obtained in Example 2 was heated to 140° C. and placed in a mold preheated to 140° C. Rigid and durable objects were obtained by the procedure used in Example 5. Rockwell hardness values of these objects were H108, M110 and L123.

Example 7

Eighty (80) parts of a copolymer consisting of 90 percent acrylonitrile and 10 percent vinyl acetate were well mixed with 20 parts of formamide to form a slurry which was heated to 150° C. while mixing continued to coalesce the polymer. Hard objects were prepared from the polymer by the techniques employed in Example 5 except pressures up to 200 p.s.i.g. were used. The objects exhibited Rockwell hardness values of H112, M112 and L120.

Example 8

Ninety-four (94) parts of a copolymer consisting of 93 percent acrylonitrile and 7 percent vinyl acetate were well mixed with 6 parts of formamide to form a mixture. The mixture was placed in a 2 x 3 inch mold of a laboratory press heated at 150° C., preheated under nominal pressure for 1 minute, compressed at 1800 p.s.i. for 2 minutes, and cooled while under pressure to 90° C. The pressure was then released and the sample removed from the mold and allowed to cool. The product was a hard rigid tile having a thickness of ¼ inch. The flexible strength of the tile was determined to be 198 kg./cm.$^2$ with a deflection of 0.18 cm.

Example 9

A 2 x 3 x ¼ inch thick tile was produced according to the procedure of Example 8 by compressing a mixture of 80 parts of the copolymer and 20 parts of formamide. The tile product had a flexible strength in excess of 390 kg./cm.$^2$ with a deflection of 0.47 cm.

Example 10

Molded acrylic tiles were produced by compressing a mixture of 94 parts of a copolymer of 92 percent acrylonitrile and 8 percent vinyl acetate and 6 parts of ethylene glycol. The mixture was preheated at 175° C. for 1 minute in the laboratory mold, compressed for 2 minutes at 1600 p.s.i., and cooled to 95° C. while under pressure. The molded product was then removed from the press and allowed to cool to room temperature. The 2 x 3 x ¼ inch tile had a flexible strength of 310 kg./cm.$^2$ and a deflection of 0.21 cm.

Example 11

The process of Example 10 was repeated by compressing a mixture of 85 parts of the copolymer and 15 parts of ethylene glycol. The 2 x 3 x ¼ inch tile product had a flexible strength of 258 kg./cm.$^2$ and a deflection of 0.19 cm.

Example 12

Forty-five (45) parts of a copolymer consisting of 93 percent acrylonitrile and 5 percent vinyl acetate were well mixed with 5 parts of formamide and 50 parts of sand as an inert filler. The mixture was placed in a 2 x 3 inch mold of a laboratory press heated at 150° C. preheated under nominal pressure for 1 minute, compressed at 1600 p.s.i. for 2 minutes, and cooled to 90° C. while under pressure. The sample was then removed from the mold and allowed to cool to room temperature. The hard tile product had a flexible strength of 290 kg./cm.$^2$ and a deflection of 0.45 cm.

Example 13

The process of Example 12 was repeated using marble chips in place of sand as the inert filler material. The resulting tile product had a flexible strength of 190 kg./cm.$^2$ and a deflection of 0.12 cm.

Example 14

The effect of various liquids having different dielectric constants on the melting point of a polymer consisting of 93 percent acrylonitrile and 7 percent vinyl acetate was determined. One hundred (100) grams of the polymer was slurried in 500 grams of the liquid to be evaluated and heated slowly with stirring. The temperature at which the polymer began to coalesce was taken as the melting temperature. The following results were obtained:

| Liquid | Dielectric Constant | Polymer Melt. point, ° C. |
|---|---|---|
| Formamide | 109 | 139 |
| Acetamide | 59 | 150 |
| Ethylene glycol | 37 | 180 |
| Propylene glycol | 33 | 185 |
| Ethylcyanoacetate | 31 (−10° C.) | 197 |
| Glycerine | 43 | 200 |

It is apparent from the above data that, in general, the higher dielectric constants of the liquids correspond to the lower melting temperatures for the polymer.

Example 15

The melting point of various acrylic and modacrylic polymer compositions in formamide were determined as described in Example 14 with the following results:

| Polymer: | Melt. point ° C. |
|---|---|
| 85% AN, 15% vinylidene chloride | 189 |
| 60% AN, 40% vinylidene chloride | 145 |
| 82.5% AN, 13% vinylidene chloride, 4.5% styrene | 150 |
| 85% AN, 9.3% vinylidene chloride, 5.7% VA | 152 |

The low melting points of the above polymers in formamide indicate their suitability for melt spinning continuous filaments or molding into tiles and the like.

It will be apparent from the foregoing illustration of the present invention that a wide range of products useful for industrial applications can be prepared more economically than by methods known heretofore. These products include textile filaments, tiles, and other molded articles shaped for particular industrial uses. Preparation of the products contemplated by the present invention may be accomplished utilizing standard spinning equipment, extrusion molding, injection molding, and compression molding techniques.

The foregoing detailed description has been given for clearness of understanding only, and unnecessary limitations are not to be construed therefrom. The invention is not to be limited to the exact details shown and described since obvious modifications will occur to those skilled in the art, and any departure from the description herein that conforms to the present invention is intended to be included within the scope of the claims.

What is claimed is:

1. A method for melting an acrylonitrile based copolymer which comprises comminuting said copolymer, blending said comminuted copolymer with ethylcyanoacetate to form a mixture and heating said mixture at atmospheric pressure to a temperature above 100° C. and below the decomposition temperature of said copolymer to melt said copolymer.

2. A method for melting an acrylonitrile based copolymer comprising comminuting said copolymer, blending said comminuted copolymer with formamide to form a mixture and heating said mixture above 100° C. and below the decomposition temperature of said copolymer to melt said copolymer.

3. The method of claim 1 wherein said mixture is comprised of from 1 to 30 percent copolymer and from 99 to 70 percent ethylcyanoacetate.

4. The method of claim 2 wherein said mixture is comprised of from 1 to 30 percent copolymer and from 99 to 70 percent formamide.

5. The method of claim 3 further characterized by the extrusion of said copolymer melt to form a shaped article.

6. The method of claim 4 further characterized by the extrusion of said copolymer melt to form a shaped article.

7. The method of claim 1 wherein said mixture is comprised of from 70 to 90 percent copolymer and from 30 to 10 percent ethylcyanoacetate and wherein upon the melting of said copolymer, transferring said melted copolymer to a preheated molding device having a shaped cavity and applying sufficient pressure to disperse the said melted copolymer uniformly in said shaped cavity to produce a rigid and hard molded product.

8. The method of claim 2 wherein said mixture is comprised of from 70 to 90 percent copolymer and from 30 to 10 percent formamide and wherein upon the melting of said copolymer transferring said melted copolymer to a preheated molding device having a shaped cavity and applying sufficient pressure to disperse the said melted copolymer uniformly in said shaped cavity to produce a rigid and hard molded product.

9. A method for melting an acrylonitrile based copolymer comprising comminuting said copolymer, blending said comminuted copolymer with acetamide to form a mixture and heating said mixture above 100° C. and below the decomposition temperature of said copolymer to melt said copolymer.

10. The method of claim 9 wherein said mixture is comprised of from 1 to 30 percent copolymer and from 99 to 70 percent acetamide.

11. The method of claim 10 further characterized by the extrusion of said copolymer melt to form a shaped article.

12. The method of claim 9 wherein said mixture is comprised of from 70 to 90 percent copolymer and from 30 to 10 percent acetamide and wherein upon the melting of said copolymer, transferring said melted copolymer to a preheated molding device having a shaped cavity and applying sufficient pressure to disperse the said melted copolymer uniformly in said shaped cavity to produce a rigid and hard molded product.

References Cited

UNITED STATES PATENTS

| | | | |
|---|---|---|---|
| 2,437,685 | 3/1948 | Dreyfus | 264—176 |
| 2,437,686 | 3/1948 | Dreyfus | 264—176 |
| 2,437,687 | 3/1948 | Dreyfus | 264—176 |
| 2,437,704 | 3/1948 | Moncrief et al. | 264—176 X |
| 2,585,918 | 2/1952 | Dalton | 260—32.6 |
| 2,601,252 | 6/1952 | Bruson | 264—206 X |
| 2,706,674 | 4/1955 | Rothrock | 264—206 |
| 2,713,041 | 7/1955 | Friendlander et al. | 260—32.6 |
| 2,776,945 | 1/1957 | Rahl et al. | 264—206 X |
| 2,824,780 | 2/1958 | Satterthwaite | 264—178 |
| 2,963,340 | 12/1960 | Satterthwaite | 264—178 |
| 3,061,402 | 10/1962 | Sanders | 264—176 |
| 3,180,845 | 4/1965 | Knudson et al. | 260—32.6 X |
| 3,188,367 | 6/1965 | Gottschalk | 264—37 |
| 2,436,204 | 2/1948 | D'Alellio | 264—206 X |
| 2,585,444 | 2/1952 | Coxe | 264—206 X |
| 2,585,499 | 2/1952 | Rothrock | 264—182 |

OTHER REFERENCES

"Spinning Solvents for Polyacrylonitrile," by G. E. Ham, Industrial & Eng. Chem. 46, 2, pp. 390–392, February 1954.

JAMES A. SEIDLECK, *Primary Examiner.*

ALEXANDER H. BRODMERKEL, *Examiner.*

J. H. WOO, *Assistant Examiner.*